July 12, 1932.   C. R. PARK   1,866,820

FORMING RUBBER STRIPS FROM LATEX

Filed May 14, 1929

Inventor
Charles R. Park

By
Attorney

Patented July 12, 1932

1,866,820

UNITED STATES PATENT OFFICE

CHARLES R. PARK, OF AKRON, OHIO, ASSIGNOR TO THE GOODYEAR TIRE & RUBBER COMPANY, OF AKRON, OHIO, A CORPORATION OF OHIO

FORMING RUBBER STRIPS FROM LATEX

Application filed May 14, 1929. Serial No. 363,092.

This invention relates to the manufacture of rubber articles and it has particular relation to the formation of such articles from latex or other similar emulsion of rubber.

One object of the invention is to provide a simple and efficient method of manufacturing relatively thick heavy plies of rubber, such as employed in the construction of tread elements for pneumatic tires, directly from latex.

Another object of the invention is to provide a relatively simple apparatus for practicing the above described method.

Heretofore, most rubber articles have been prepared from solid rubber, obtained from latex that had been coagulated upon the plantation where it is produced. It is necessary in the manufacture of goods from such rubber first to break the rubber down upon a mill and then to introduce the pigments, sulphur and other compounding ingredients therein while the rubber is being milled. Obviously, this process involves a relatively large number of intermediate steps. Also, considerable power and time is consumed in the operation of milling the rubber.

It has been proposed to overcome these defects by coagulating latex, containing the requisite compounding ingredients, directly upon forms or mandrels to form the articles. However, these methods are not adapted for the formation of relatively thick, heavy, continuous plies of material such as employed as treads for pneumatic tires.

This invention consists in the provision of an apparatus for and a method of preparing articles directly from coagulated latex which has been intermixed with suitable compounding materials, in which a plurality of thin sheets or strips of latex are extruded into a coagulating bath and are then pressed together to form a single heavy sheet.

For a better understanding of the invention, reference may now be had to the accompanying drawing, forming a part of the specification, of which;

Figure 1:
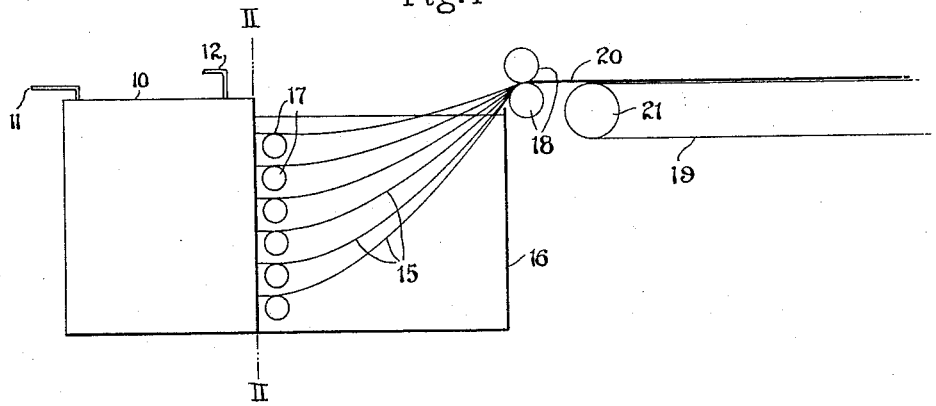
Figure 1 is a diagrammatical elevational view of an embodiment of apparatus for practicing the invention.
Figure 2:
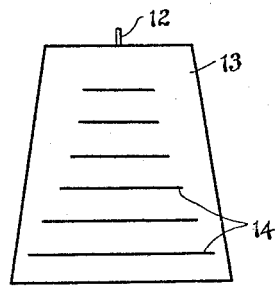
Figure 2 is a cross-sectional view taken upon the line II—II of Figure 1, disclosing a plate or die employed for extruding the latex into a coagulating bath.
Figure 3:
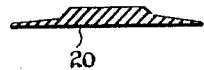
Figure 3 is a cross-sectional view of a tread ply for pneumatic tires which has been prepared upon the apparatus embodied in this invention.

In practicing the invention, an enclosed container or tank 10 is provided with a conduit 11 for introducing latex therein. The tank is also provided with a second conduit 12 through which air or other fluid under compression is admitted, in order to apply sufficient pressure to the latex to force it from the tank. Upon its forward side, the tank is provided with a plate or die 13 of trapezoidal contour having a series of narrow horizontal slots 14 formed therein, through which thin flat strips or sheets 15 of latex are extruded. If the apparatus is to be employed in the manufacture of stock for the tread plies of pneumatic tires, the slots 14 should be of graduated length, in order to impart to the stock the trapezoidal contour characteristic of such plies.

The slots 14 are so disposed as to discharge the strips directly into a tank 16 containing acetic acid or other suitable latex coagulant.

As best shown in Figure 1, the thin strips of latex 15 from the tank 10 are passed over a series of horizontal supporting rollers 17 which are so disposed in the tank as partially to support the weight of the freshly formed strips of coagulated rubber. A pair of presser rolls 18 driven by any convenient means (not shown) are disposed adjacent the upper forward edge of the tank 16 in position to receive the strips of material from the rollers 17, and a conveyor belt 19 mounted upon a roller 21 is disposed adjacent the rollers 18 in position to receive and remove a laminated strip of material 20 composed of the assembled strips 15.

In practicing the invention, the tank 10 is filled with latex containing the requisite compounding ingredients, while the tank 16 is filled with a suitable coagulant, such as acetic acid or acetone. Fluid under compression (compressed air) is then admitted to the tank 10 through the conduit 12. The pressure thus generated within the tank forces the latex outwardly through the slots 14 in flattened strips which are conducted over the rollers 17. The coagulant immediately causes the rubber contained in the latex to coagulate to form the strips 15 of solid material in which the pigments and other compounding ingredients are incorporated. The rollers 17 serve to support the freshly formed strips temporarily in order that they may become sufficiently set to bear their own weight before they are trained forwardly and upwardly through the coagulating bath, where the process of coagulation is completed, and thence between the rollers 18 which press them together. These rollers cause adhesion between the strips and also press out a portion of the liquid which may be entrapped in the rubber. It is desirable, although not essential, that the rollers should be of such contour as to impart to the freshly formed strip of material the desired cross-sectional profile. The laminated strip formed by the rollers 18 is conducted away by means of the conveyor 19 for subsequent manipulation. The latter steps do not constitute a portion of this invention, and, therefore, it is not deemed necessary to describe them in detail.

By employing the invention disclosed, the usual steps of plasticizing and compounding the rubber while it is in a solid state are entirely obviated. As a result, the rubber is not broken down and, therefore, it retains substantially all of the tensile strength, elasticity and durability inherent in rubber which has not been milled. Furthermore, the expense and loss of time entailed in the milling of rubber by ordinary methods are obviated.

The method of compounding rubber may be employed for the manufacture of substantially any relatively long strips of material, such as stock used in the manufacture of tread plies for pneumatic tires, or in the manufacture of the threads of solid tires. These articles are of such thickness that they cannot be formed directly from latex by ordinary methods of coagulation. However, by employing a large number of relatively thin ribbons of latex it is possible adequately to coagulate all portions of the rubber.

Although I have illustrated only the preferred forms which the invention may assume, it will be apparent to those skilled in the art that the invention is not so limited, but that various modifications may be made therein without departing from the spirit of the invention or from the scope of the appended claim.

What I claim is:

A machine for manufacturing rubber articles from compounded latex comprisng an enclosed container, means for creating pressure within the container, a plurality of openings formed in the container, a container for coagulant so disposed as to receive filaments of latex extruded through the openings in the container, rollers disposed in the container in position partially to support the filaments as they emerge from the openings, rollers disposed adjacent the coagulant container for drawing the strips of coagulated material from the coagulant container and for pressing them together, and means for conveying away the strips of material thus formed.

In witness whereof I have hereunto signed my name at Akron, in the county of Summit and State of Ohio, U. S. A., this 13th day of May, 1929.

CHARLES R. PARK.